(12) United States Patent
Lautenschläger

(10) Patent No.: US 9,132,406 B2
(45) Date of Patent: Sep. 15, 2015

(54) HIGH-PRESSURE VESSEL

(75) Inventor: Werner Lautenschläger, Heerbrugg (CH)

(73) Assignee: MWT Mikrowellen Labor Technik AG, Heerbrugg (CH)

(*) Notice: Subject to any disclaimer, the term of this patent is extended or adjusted under 35 U.S.C. 154(b) by 451 days.

(21) Appl. No.: 13/053,446

(22) Filed: Mar. 22, 2011

(65) Prior Publication Data

US 2011/0226608 A1  Sep. 22, 2011

(30) Foreign Application Priority Data

Mar. 22, 2010  (DE) .......................... 10 2010 003 126
Mar. 23, 2010  (DE) .......................... 10 2010 012 398
Jun. 21, 2010  (DE) .......................... 10 2010 030 287

(51) Int. Cl.
*B01J 19/12* (2006.01)

(52) U.S. Cl.
CPC .......... *B01J 19/126* (2013.01); *B01J 2219/123* (2013.01); *B01J 2219/1215* (2013.01); *B01J 2219/1218* (2013.01); *B01J 2219/1233* (2013.01); *B01J 2219/1236* (2013.01); *B01J 2219/1242* (2013.01)

(58) Field of Classification Search
CPC ............. B01J 2219/1233; B01J 19/126; B01J 2219/123; B01J 2219/1236; B01J 2219/1218; B01J 2219/1215; B01J 2219/1242
USPC ........ 204/157.15, 157.43; 422/186, 306, 307, 422/243
See application file for complete search history.

(56) References Cited

U.S. PATENT DOCUMENTS

| | | | | |
|---|---|---|---|---|
| 4,103,801 A | * | 8/1978 | Walker ..................... | 220/203.07 |
| 4,347,216 A | * | 8/1982 | Kawasaki et al. ............. | 219/686 |
| 4,406,861 A | * | 9/1983 | Beauvais et al. .............. | 219/686 |
| 4,490,597 A | * | 12/1984 | Mengel ......................... | 219/735 |
| 5,217,687 A | * | 6/1993 | Sewell ........................... | 422/22 |
| 5,382,414 A | * | 1/1995 | Lautenschlager .............. | 422/186 |
| 5,728,310 A | * | 3/1998 | Ice et al. ....................... | 219/679 |
| 6,033,912 A | * | 3/2000 | Lautenschlager .............. | 219/679 |
| 6,054,695 A | * | 4/2000 | Lautenschlager .............. | 219/687 |
| 6,097,015 A | * | 8/2000 | McCullough et al. ........ | 219/686 |
| 6,242,723 B1 | * | 6/2001 | Lautenschlager .............. | 219/679 |
| 6,717,119 B2 | * | 4/2004 | Ondruschka et al. ......... | 219/679 |
| 6,949,227 B2 | * | 9/2005 | Lautenschlager et al. .... | 422/186 |
| 7,109,452 B2 | * | 9/2006 | Collins et al. .................. | 219/687 |
| 7,144,739 B2 | * | 12/2006 | Jennings ........................ | 219/678 |
| 2003/0127313 A1 | * | 7/2003 | Lautenschlager ............... | 202/96 |
| 2011/0233203 A1 | * | 9/2011 | Visinoni et al. ................ | 219/756 |

FOREIGN PATENT DOCUMENTS

DE  4114525  8/1992

* cited by examiner

*Primary Examiner* — Keith Hendricks
*Assistant Examiner* — Colleen M Raphael
(74) *Attorney, Agent, or Firm* — Fish & Tsang LLP

(57) ABSTRACT

The invention describes a high-pressure vessel for holding samples which are to be heated, the high-pressure vessel having: a lower part (5, 104) and a lid part (6, 105) which can be locked together and when closed surround on all sides a reaction chamber for initiating and/or promoting chemical and/or physical high-pressure reactions, it being possible for the lower part (5, 104) and the lid part (6, 105) to be moved relative to each other in an automated fashion between an open access position and a closed microwave processing position, a sample holder (101) and/or a vessel insert (9) being connected to the lid part (6, 105).

15 Claims, 8 Drawing Sheets

HIGH-PRESSURE VESSEL

This application claims the benefit of European patent applications with the serial numbers EP 10 2010 033 126.7, EP 10 2010 012 398.6, and 10 2010 030 287.2.

FIELD OF THE INVENTION

The present invention relates to a high-pressure vessel, a system with a housing arrangement having the high-pressure vessel or vessels, and a process for initiating and/or promoting chemical and/or physical high-pressure reactions on samples by means of the high-pressure vessel.

BACKGROUND OF THE INVENTION

A device for initiating and/or promoting chemical and/or physical high-pressure reactions on samples by the action of microwaves is known from DE 41 14 525. The device shown therein has a cooling device in the upper region, therefore above the region in which the sample is arranged in the sample vessel, such that corresponding gaseous products that occur in the reaction chamber condense and can be fed back to the reaction. In order to lock the coupling opening securely, relatively high temperatures are desired in a region of the sample vessel which surrounds the sample itself, such that said region can expand in a corresponding fashion in order to come into full abutment with the high-pressure vessel. The cooling in a region of the high-pressure vessel and the relatively high heating in another region of the high-pressure vessel result, on the one hand, in high tensions in the material of the high-pressure vessel. On the other hand, in particular in the highly heated region of the high-pressure vessel, the latter is, owing to the high thermal changes in each sample run, so highly stressed that its operating life is limited.

SUMMARY OF THE INVENTION

It is thus an object of the invention to make available a high-pressure vessel with which secure and rapid sample processing is made available with simultaneously relatively low stress or loading of the high-pressure vessel.

A high-pressure vessel is provided for holding samples which are to be heated, the high-pressure vessel having: a lower part and a lid part which can be locked together and when closed surround on all sides a reaction chamber for initiating and/or promoting chemical and/or physical high-pressure reactions, it being possible for the lower part and the lid part to be moved relative to each other in an automated fashion between an open access position and a closed microwave processing position, a sample holder and/or a vessel insert being connected to the lid part.

The sample holder and/or the vessel insert are preferably detachably connected to the lid part.

The lid part preferably has a mechanical holder or magnetic retainer for holding the sample holder and/or the vessel insert.

Moreover, the high-pressure vessel preferably has a motor by means of which the magnets of the magnetic retainer can be driven rotatably.

A stirrer which can be driven by the magnetic retainer is preferably arranged in the magnetic rotatably driven retainer.

Moreover, the high-pressure vessel preferably has a retaining means with which the lower part and the lid part can be locked.

The retaining means preferably has two clamp halves which together form a substantially circular clamp.

When closed, the clamp halves are preferably secured against each other by a bolt.

A thread of the bolt preferably engages in a thread in one of the two clamp halves such that the latter can be pulled against each other.

That part of the thread of the bolt which projects beyond the thread of one of the clamp halves preferably has a length, when the vessel is closed, such that the protruding part abuts, because of its length, in a locking fashion against a wall in a recess of the clamp halves.

A high-pressure vessel is provided for holding samples to be heated in a reaction chamber, surrounded on all sides by the high-pressure vessel, for initiating and/or promoting chemical and/or physical high-pressure reactions. The high-pressure vessel has a material that withstands high pressures. The high-pressure vessel has an insulation lining enclosing the reaction chamber, and a cooling arrangement that surrounds at least the region of the sample holder of the high-pressure vessel in such a way that the high-pressure vessel can be heated and cooled simultaneously.

A high-pressure vessel is in this way made available in which, on the one hand, the wall of the high-pressure vessel is, owing to the insulation lining and despite the heating of the samples, thermally affected in a delayed fashion and/or more weakly, while the wall of the high-pressure vessel is simultaneously cooled by means of the cooling arrangement, in particular at least in that region of the sample holder in the high-pressure vessel to which a high thermal load is applied, in such a way that the high-pressure vessel is exposed to only relatively small fluctuations in temperature and thus thermal loads, or none at all, which in turn extends its operating life. Furthermore, on the one hand a rapid heating of the sample is thus made possible as the sample too is shielded relative to the cooled high-pressure vessel by means of the insulation lining. On the other hand, the samples can be cooled relatively rapidly after the heating process is complete so that a rapid and high sample throughput can be achieved with optimum decomposition quality and the processed samples can be handled again relatively quickly after the heating.

The high-pressure vessel preferably consists of a pot-shaped lower part and a lid, which when the vessel is closed surround the reaction chamber on all sides.

The lid is preferably pretensioned toward the lower part in order to form the closed reaction chamber, the pretensioning taking a form such that the lid and the lower part move away relative to each other counter to the pretensioning when a predetermined internal pressure is reached, in order not to exceed the predetermined internal pressure by allowing pressure to escape.

A seal, which when the vessel is closed and pretensioned securely seals off the reaction chamber from the outside, is preferably provided between the lid and the lower part.

The seal is preferably an O-ring, preferably made from PTFE.

A recess or a groove is preferably provided on the inner side of the lower part, a short PTFE tube shoulder being laid in the recess or the groove and the O-ring bearing against the inner side of the tube shoulder.

The insulation lining preferably forms a vessel insert which can be inserted into the high-pressure vessel.

The insulation lining is preferably made of plastic, PTFE or ceramic.

The high-pressure vessel is preferably made of metal, preferably steel, particularly preferably a special metal alloy.

The samples are preferably heated by the action of microwaves, the reaction chamber being at least partially microwave-transparent and it being possible for the microwave-transparent high-pressure vessel to be connected to a microwave generator by a microwave-transparent coupling opening.

The samples can preferably be heated directly by a thermal immersion heater.

The immersion heater is preferably arranged in the lid.

In order to create an internal pressure in the reaction chamber, the high-pressure vessel preferably has a fluid inlet and a fluid outlet for the purpose of allowing an internal pressure in the reaction chamber which exceeds a specified value to escape.

The high-pressure vessel preferably has a gas purging arrangement, the gas purging arrangement having a fluid inlet and a fluid outlet.

The fluid inlet and the fluid outlet are preferably arranged in the lid.

A gas feed line preferably extends from the fluid inlet of the gas purging arrangement to a gas supply chamber, the gas supply chamber having a purging gas which is at a predefined feed pressure, for example 50 bar, and at least one non-return valve, which permits the feeding of gas only to the reaction chamber, being situated between the gas supply chamber and the reaction chamber.

A gas cylinder is preferably connected, via a manometer and a prefilter, to the gas supply chamber to provide the purging gas in the gas supply chamber.

The purging gas is preferably argon (Ar), nitrogen ($N_2$), hydrogen ($H_2$) or another known purging gas.

A gas outlet line preferably extends from the fluid outlet away from the reaction chamber, an escape valve being arranged in the gas outlet line for selectively opening and closing the gas outlet line.

The cooling arrangement is preferably a circulatory cooling system and has at least one inlet and one outlet for a cooling medium.

A system is moreover provided for initiating and/or promoting chemical and/or physical high-pressure reactions on samples by the use of heat. The system has: a housing arrangement, wherein the housing arrangement includes one or more high-pressure vessels which hold the samples in a reaction chamber.

The samples can preferably be moved together with the lid and relative to the lower part, it being possible for the samples to be inserted into the high-pressure vessel or removed from the high-pressure vessel by virtue of the relative movement, preferably being moved in and out automatically.

A plurality of high-pressure vessels preferably have a lid with lid regions that correspond to the high-pressure vessels and are provided with an insulation lining.

Moreover, the system preferably has an automatically actuatable pin, the pin engaging in recesses of the clamp halves when the two clamp halves are closed, when these recesses lie flush one above the other when the vessel is closed.

Moreover, the housing arrangement preferably has a protective hood which is attached above the high-pressure vessel arrangement and has a sealed region which is preferably accessible from outside.

The region is preferably provided with a suction device in order to securely drain off gases that occur or gases that escape in the event of excess pressure.

BRIEF DESCRIPTION OF THE DRAWING

Further embodiments and advantages of the invention and the process for initiating and/or promoting chemical and/or physical high-pressure reactions on samples with the high-pressure vessel are described below with reference to exemplary embodiments in conjunction with the figures of the attached drawings, in which.

DETAILED DESCRIPTION

Figure 1:
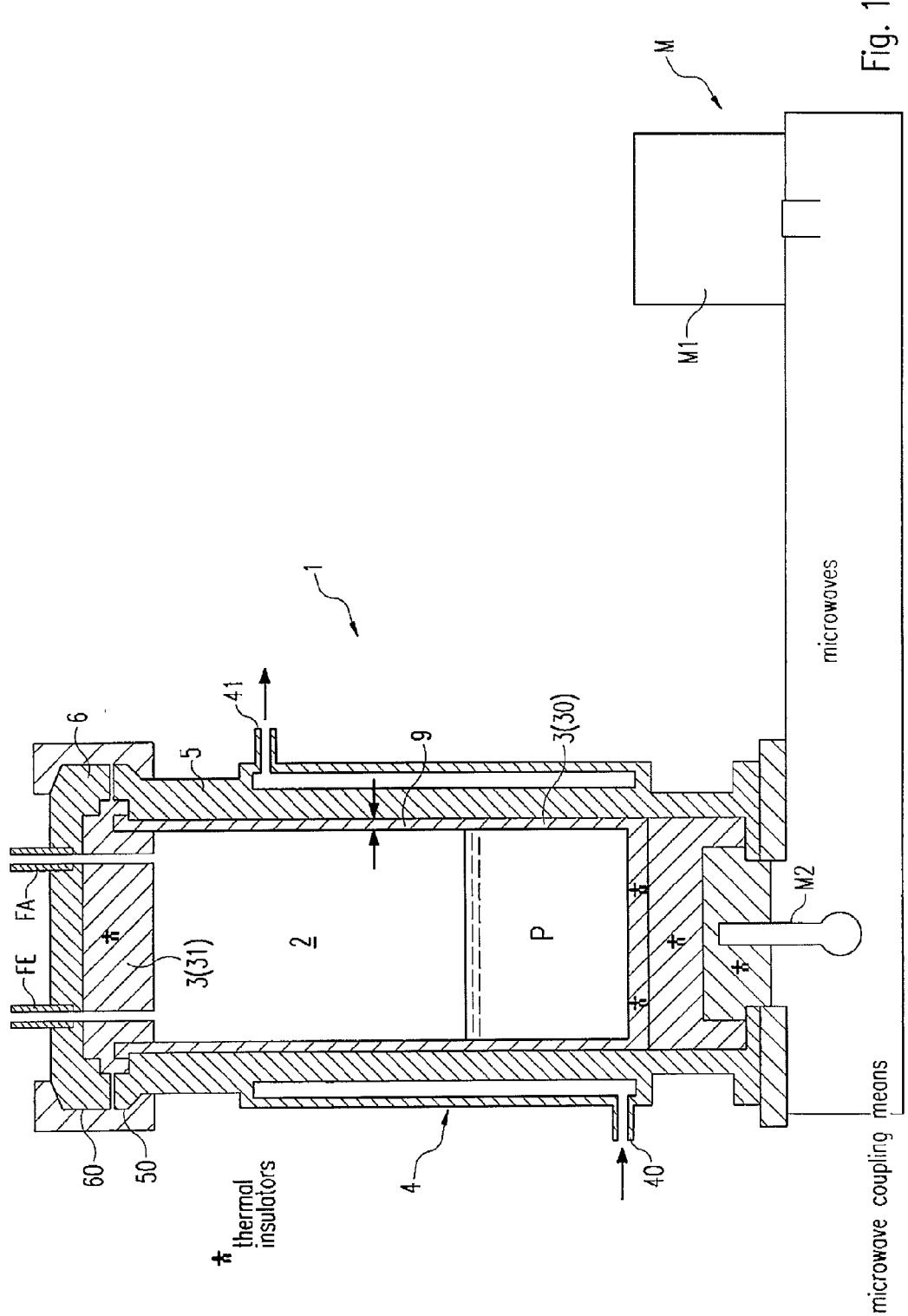
FIG. 1 shows a first embodiment with microwave heating.
Figure 2:
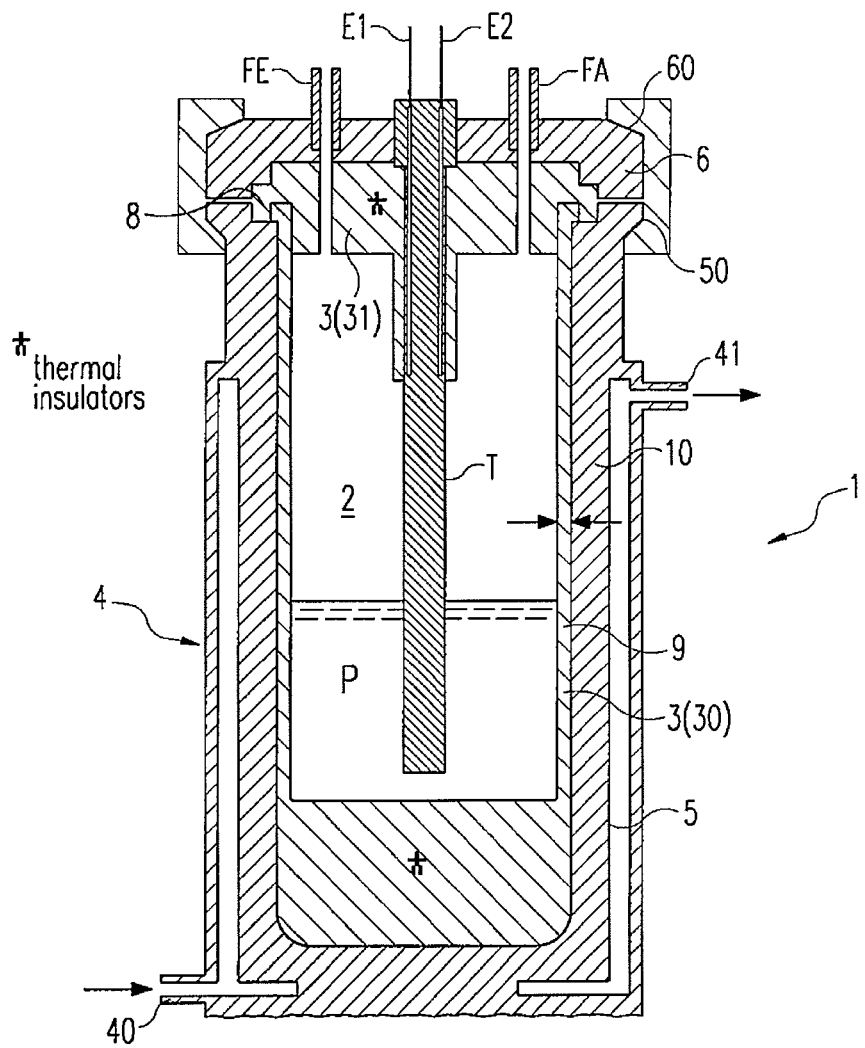
FIG. 2 shows a second embodiment with a thermal immersion heater.

FIGS. 1 and 2 show a first and second embodiment of a high-pressure vessel 1 according to the invention (also referred to below as "vessel" or "sample vessel") for holding samples P which are to be heated for initiating and/or promoting chemical and/or physical high-pressure reactions on the samples P. The high-pressure vessel 1 is made of a material which withstands high pressure such as, for example, metal, preferably steel and particularly preferably a special metal alloy. The high-pressure vessel 1 is here preferably designed in such a way that it can be used at pressures up to at least 200 bar, preferably up to at least 500 bar, and at temperatures of over 300° C.

The high-pressure vessel 1 surrounds a reaction chamber 2. The sample P is arranged in the reaction chamber 2 for sample processing and can be removed from the latter preferably through an opening.

The high-pressure vessel 1 moreover has an insulation lining 3 (a so-called liner) enclosing the reaction chamber 2. This insulation lining 3 is preferably made of plastic, PTFE, ceramic or tantalum. The insulation lining 3 thus serves, on the one hand, as an insulator of the high-pressure vessel 1 with respect to the heated sample and serves, on the other hand, in addition to reducing the thermal load, as corrosion protection for the inner wall of the high-pressure vessel and as protection of the inner wall of the high-pressure vessel with respect to chemical contamination by the sample.

Moreover, the high-pressure vessel 1 has a cooling arrangement 4 which is arranged in such a way that it surrounds at least the region of the sample holder of the high-pressure vessel 1. The region of the sample holder is here the region in the reaction chamber in which the sample is located for the sample reaction; in particular here, as in the embodiments shown as well, it is the lower region of the reaction chamber 2. The cooling arrangement 4 preferably surrounds the side walls 10 of the high-pressure vessel 1 over its entire length, and particularly preferably the cooling arrangement 4 surrounds the entire high-pressure vessel 1, in particular the regions on which the insulation lining 3 is arranged. In this way, the high-pressure vessel 1, which is heated during the sample reaction from inside by means of the heated sample P, is simultaneously cooled so that the thermal loading of the high-pressure vessel 1 can be regulated accordingly and be held, for example, below a predetermined temperature. For example, a temperature gradient of the insulation lining 3 of from 300° C. to room temperature can be achieved simply when an insulation lining 3 that is only 5 mm thick or thin is used. In this way, the high-pressure vessel 1 can be cooled by the cooling arrangement 4 in such a way that the temperature can be held, at the transition between the inner wall of the high-pressure vessel and the insulation lining 3, at room temperature or at any temperature determined in advance by the user. If the temperature of the high-pressure vessel 1 is low in comparison to the sample space or the reaction chamber 2, in other words for example under 100° C., preferably room temperature or below, then corrosion of the high-pressure vessel 1 is prevented too, for example because of acid molecules or the like diffusing from the reaction chamber 2 through the insulation lining 3. The operating life of the high-pressure vessel 1 is thereby considerably extended compared with a high-pressure vessel which is only cooled irregularly or not at all. In this way, absolutely identical conditions can also be obtained inside the reaction chamber 2, which in turn results in a more rapid and more accurate sample processing. Because of the identical conditions in the reaction chamber 2, all analysis processes can, for example by using internal reference standards, be permanently subjected to an analytic quality control, for example then with a certificate too.

The cooling arrangement 4 preferably has at least one fluid inlet 40 and one fluid outlet 41 for a cooling medium so that it can take the form of a circulatory cooling system. A fluid, preferably air or a liquid coolant, is used as a coolant. When the temperature of the high-pressure vessel 1 is to be kept below 100° C., preferably at room temperature, water can, for example, be used as a cooling medium, which is particularly easily available and inexpensive. In addition, any other known cooling medium can also be used which has a higher (or lower) boiling point and/or a higher (or lower) thermal gradient than water. The cooling medium is, for example, conveyed outside the high-pressure vessel 1 through the circulation cooler 4 by means of a pump arrangement (not shown) and is cooled by means of a cooling element (not shown) such as, for example, a heat exchanger. The cooling arrangement can, for example, also take the form of a (circulatory) cryostat, the cooling medium being introduced into the system at very low temperatures in order, owing to the high temperature difference, to achieve a cooling of the high-pressure vessel 1, for example to room temperature, compared with the reaction chamber 2, for example heated to 300° C. When, for example, microwave heating is used, despite the high wave density in the reaction chamber 2, a corresponding cooling and protection of the high-pressure vessel 1 is obtained compared with conventional autoclaves. In particular, the high-pressure vessel 1 is protected in such a way that, for example, corrosion owing to substances diffusing through from the reaction chamber 2 is prevented.

The high-pressure vessel 1 preferably consists of a (pot-shaped) lower part 5 and a lid part 6 (also referred to below as a "lid") which surround the reaction chamber 2 on all sides when the vessel is closed. The lid 6 thereby seals the opening, provided in the high-pressure vessel 1 and thus the lower part 5 of the high-pressure vessel 1, for inserting and extracting the sample P. The invention is, however, not limited to the above-mentioned form. At least the lower part 5 thereby has the insulation lining 3, 30, and the lid 6 preferably also has the insulation lining 3, 30.

In particular, the high-pressure vessel 1 has the lower part 5 and the lid part 6 which can be locked together and, when the vessel is closed, surround on all sides the reaction chamber 2 for initiating and/or promoting chemical and/or physical high-pressure reactions.

As can be seen in FIG. 1, both the lower part 5 and the lid 6 have corresponding flange regions 50, 60. The lower part 5 and the lid 6 are pressed against each other, by means of retaining means 7 such as, for example, clamps which are arranged about the flange regions 50, 60, in such a way that the high-pressure vessel 1 surrounds and thus forms the securely locked pressure-resistant reaction chamber 2. The retaining means or locking device is/are explained in more detail below with reference to FIGS. 5 and 9.

In a particularly preferred embodiment, the lid 6 is pretensioned, preferably by a spring, toward the lower part 5 and is thus locked with the aid of spring force in order to form the closed reaction chamber 2. The pretensioning (by a spring) is here designed in such a way that the lid 6 and the lower part 5 move away relative to each other counter to the pretensioning by a spring when a predetermined internal pressure is reached inside the reaction chamber 2. In this way, the predetermined internal pressure cannot be exceeded as a result of allowing pressure to escape, i.e. when the pretensioned lid 6 lifts off (slightly) owing to a high internal pressure. An excessive internal pressure which could lead to damage of the high-pressure vessel 1 is thus prevented. Furthermore, predetermined reaction conditions can in this way be provided by predetermined pressure ratios in the reaction chamber 2.

In a particularly preferred embodiment, a seal 8 is provided between the lid 6 and the lower part 5, preferably between the lid 6 and the insulation lining 3, 30 of the lower part 5, and securely seals off the reaction chamber 2 from the outside when the high-pressure vessel 1 is closed and thus pretensioned (by a spring). The seal 8 and its arrangement and form is, like the surrounding components, described in more detail below. Any unevennesses, in particular in the flange regions, are compensated for by means of the seal 8 and a securely sealed reaction region is obtained in the reaction chamber 2. The seal 8 here preferably takes the form of an O-ring. Moreover, the seal 8 is preferably securely arranged and held in a correspondingly provided groove in the lid 6 or high-pressure vessel 1, thus in the lower part 5 or the insulation lining 3. Moreover, the seal 8 can preferably additionally be held by that wall of the lid 6 or of the lower part 5 which surrounds it. The seal 8 is preferably produced from PTFE.

In a preferred embodiment, the insulation lining 3 forms a vessel insert 9 (also referred to below as a "PTFE insert") which can be inserted into the high-pressure vessel 1. The vessel insert 9 can be arranged on the lid 6 and is preferably detachably connected to the lid 6. It is thus made considerably easier to handle the samples P.

The samples P can particularly preferably be moved together with the lid 6 relative to the lower part 5. In this way, after the reaction the samples P together with the lid 6 can be taken out of the high-pressure vessel 1, or to be more precise the lower part 5, or placed inside the high-pressure vessel 1 for sample reactions. This preferably happens by being automatically moved in and out. In this way, it is made possible to simply introduce the samples P and simply remove them from the high-pressure vessel 1, as a result of which the inconvenient and elaborate locking of individual high-pressure vessels 1 is no longer required, which saves on sample processing. It is, for example, conceivable that the samples P are introduced directly in the vessel insert 9. The sample P can, when the vessel insert 9 is connected detachably to the lid 6, be moved simply out of the high-pressure vessel 1 with the lid 6 and moved back into it again. However, multiple samples P can, for example, also be arranged in a sample holder. This sample holder can, to simplify the handling of the individual samples P, be attached to the lid 6 or preferably be connected detachably to the latter, as explained in more detail below. In this way, the processing time of a sample P is reduced and the elaborate locking of each individual high-pressure vessel or each individual sample P is avoided. For example, the sample holder and the vessel insert 9 can also be connected, and preferably detachably connected, to the lid.

According to the embodiment, the lower part 5 and the lid part 6 can be moved relative to each other in an automated manner between an open access position and a closed microwave-processing position, a sample holder (for example, the sample holder 101 which is described below with reference to FIG. 5) and/or a vessel insert 9 being connected to the lid part 6.

The samples P can be heated in a different way. According to FIG. 1, they can, for example, be heated by the action of microwaves. The reaction chamber 2 is then at least partially microwave-transparent and the high-pressure vessel 1 is preferably microwave-transparent. The microwave-transparent high-pressure vessel 1 can be attached to a microwave generator M via a microwave-transparent coupling opening K. To this end, for example to inject the microwaves, the coupling opening is provided in the base of the high-pressure vessel 1 and a magnetron M1 or a waveguide or an associated radiating element such as an antenna M2 is arranged in said coupling opening. As a consequence, the microwaves are preferably introduced through the base part of the high-pressure vessel 1 in a tubular metal reactor.

As shown in FIG. 2, the samples P can, for example, also be heated directly by a thermal immersion heater T. The immersion heater T can here be provided directly in the lid 6, the immersion heater T being designed in such a way that it projects into the reaction chamber 2 as far as the region of the sample holder. If multiple samples P are arranged in individual sample vessels and, for example, in a sample holder in the high-pressure vessel 1, in other words the reaction chamber 2, one immersion heater T as described above can in each case be provided for each sample vessel or each sample P. The electrical connections E1, E2 for the immersion heater T are similarly preferably provided in the lid 6.

The high-pressure vessel 1 can moreover have a fluid inlet FE and a fluid outlet FA in the reaction chamber 2, the inlet FE and the outlet FA preferably being arranged in the lid 6. The inlet FE and the outlet FA can then form a so-called gas purging device (G; see FIG. 10 for purging a gas situated in the reaction chamber 2. In another optional or additional embodiment, the inlet FE serves to create an internal pressure in the reaction chamber 2, while the outlet FA serves to allow an internal pressure in the reaction chamber 2 which exceeds a determined threshold value to escape. To this end, a valve, which opens at a corresponding excess pressure in order to prevent damage to the device, is preferably provided in the outlet FA. The inlet FE and the outlet FA are preferably connected to lines for supplying and discharging a gas or for creating an internal pressure in the high-pressure vessel 1. The line which is connected to the outlet FA preferably has a larger diameter than the line which is connected to the inlet FE as the line of the outlet FA must withstand the high internal pressure and the high temperatures in the event of allowing pressure to escape. If the above-described inlet FE and outlet FA are provided to allow pressure to escape, either the above-described seal 8 can be provided in such a way that, when pressure is allowed to escape by the lid 6 lifting off counter to the pretensioning, the seal 8 frees up a gap between the lid 6 and the lower part 5 or the insulation lining 3, 30 to allow pressure to escape. Alternatively, the seal 8 can also be provided in such a way that it ruptures when the lid 6 is lifted off and thus the internal pressure in the high-pressure vessel 1 can fall suddenly, for example when it is no longer possible to reliably safeguard against excess pressure by means of the valve provided in the line of the outlet FA. In this case, a suction device is preferably provided in order to safely suck up any gases emitted.

Furthermore, a system is preferably provided for initiating and/or promoting chemical and/or physical high-pressure reactions on samples P by using heat. The system here comprises a housing arrangement (not shown), the housing arrangement comprising one or more high-pressure vessels 1 according to the preceding embodiments which hold the samples P in the reaction chamber 2.

The housing arrangement can, moreover, have a cover (for example a protective hood) which is attached above the high-pressure vessel arrangement, and a sealed region which can preferably be accessed from outside. This region is preferably provided with a suction device in order to securely drain off gases that occur or gases that escape in the event of excess pressure.

The system can furthermore comprise a control unit for controlling the course of the sample reaction.

If multiple high-pressure vessels 1 are arranged in the housing arrangement, the system can have a single lid for these multiple high-pressure vessels 1. In a corresponding fashion to the high-pressure vessel 1 in the housing arrangement, this lid with the respective high-pressure vessels 1 has corresponding lid regions provided with an insulation lining 3. In this way, multiple samples P in multiple high-pressure vessels 1 can be moved, preferably automatically, into and out of the corresponding lower parts 5 in the housing arrangement. There is thus no need to lock each individual high-pressure vessel 1, which results in a reduction of the time required for the process. It is also conceivable that the system contains only one high-pressure vessel 1 with multiple samples P, for example arranged in above-described sample holders, as has already been described above.

The samples P together with the single lid for multiple high-pressure vessels 1 can preferably be moved relative to the lower parts 5, the insulation lining 3 preferably forming a vessel insert 9 which can be inserted into the high-pressure vessel 1 and being arranged on the corresponding lid regions and/or being connected detachably to the latter. As an alternative to or in addition to the vessel inserts 9, an above-described sample holder can, for example, also be provided for each or part of the high-pressure vessel 1. A desired number of sample holders and/or vessel inserts 9 can here be individually connected and/or detachably connected to the lid 6. It can thus be made significantly easier to handle the samples P. In this way, after the reaction all the samples P can simultaneously be taken out of the respective high-pressure vessels 1, or to be more precise the lower parts 5, together with the single lid and placed in the high-pressure vessel 1 for sample reactions.

A process for initiating and/or promoting chemical and/or physical high-pressure reactions on samples P is shown below, also with reference to FIGS. 3 and 4. The sample reaction can here be carried out with just one sample P in a high-pressure vessel 1, or alternatively multiple samples P can be provided in one or correspondingly multiple high-pressure vessels 1 in an abovementioned system with a housing arrangement. The samples P arranged in the reaction chamber 2 surrounded on all sides by the high-pressure vessel 1 are heated by heat such as, for example, by microwaves or a thermal immersion heater T and are thus preferably exposed to a pressure (for example, via the fluid inlet FE). The high-pressure vessel 1 made from a material that can withstand a high pressure has the insulation lining 3, preferably made from PTFE, which encloses the reaction chamber 2. The heated sample P and the high wave density through the microwaves, for example at 1500 W, heats up said high-pressure vessel 1 by virtue of the insulation lining 3 only in a delayed fashion and/or weakened form in comparison with an arrangement with no insulation lining, so that the high-pressure vessel 1 is exposed to only relatively low thermal loads or differences. This is also positively influenced by the high-pressure vessel 1 having, at least in the region of the sample holders of the high-pressure vessel 1, preferably over the entire region of the side walls of the high-pressure vessel 1, the cooling arrangement 4 which surrounds said region and which simultaneously cools the high-pressure vessel 1, in particular in the region of the greatest heating, and hence counteracts the thermal loads on the sample P and the heating on the high-pressure vessel 1. In this way, a thermal loading of the high-pressure vessel 1 can be reduced or prevented altogether. The high-pressure vessel 1 is in particular cooled in such a way that it does not exceed a predetermined temperature threshold value. To this end, the cooling can start or be switched off again when a specified temperature of the high-pressure vessel 1 is reached, or the wall of the high-pressure vessel is preferably cooled from the very beginning of the heating process and/or permanently. In the case of permanent cooling from the beginning of the heating process, it can be prevented early on that the temperature of the wall of the high-pressure vessel, for example room temperature, is exceeded. It is also conceivable that the cooling only starts later or is switched off before the sample reaction is complete. However, the cooling preferably starts before or at least at the beginning of the heating process and also continues after the heating process is complete. As a result of the timely use of the cooling at the beginning and permanently during the course of the experiment, wear on the high-pressure vessel 1 is considerably reduced. The temperature difference or temperature gradient between the reaction chamber 2 and the high-pressure vessel 1 is (suddenly) reduced by the further cooling after the heating process is complete, so that a particularly rapid cooling of the sample P is enabled despite the insulation lining 3, while the wall of the high-pressure vessel is furthermore held at a constantly low level. During and after the heating process, corrosion of the high-pressure vessel is thus also prevented owing to the constantly low temperatures and its operating life is considerably extended.

Extremely rapid heating rates can thus be obtained by the direct heating of the sample P. As a result of the simultaneous cooling, preferably permanently and from the beginning, the thermal loading of the high-pressure vessel 1 is, on the one hand, reduced and as a consequence a rapid cooling of the sample P can simultaneously be achieved in this way after the sample reaction has been conducted.

Figure 3:
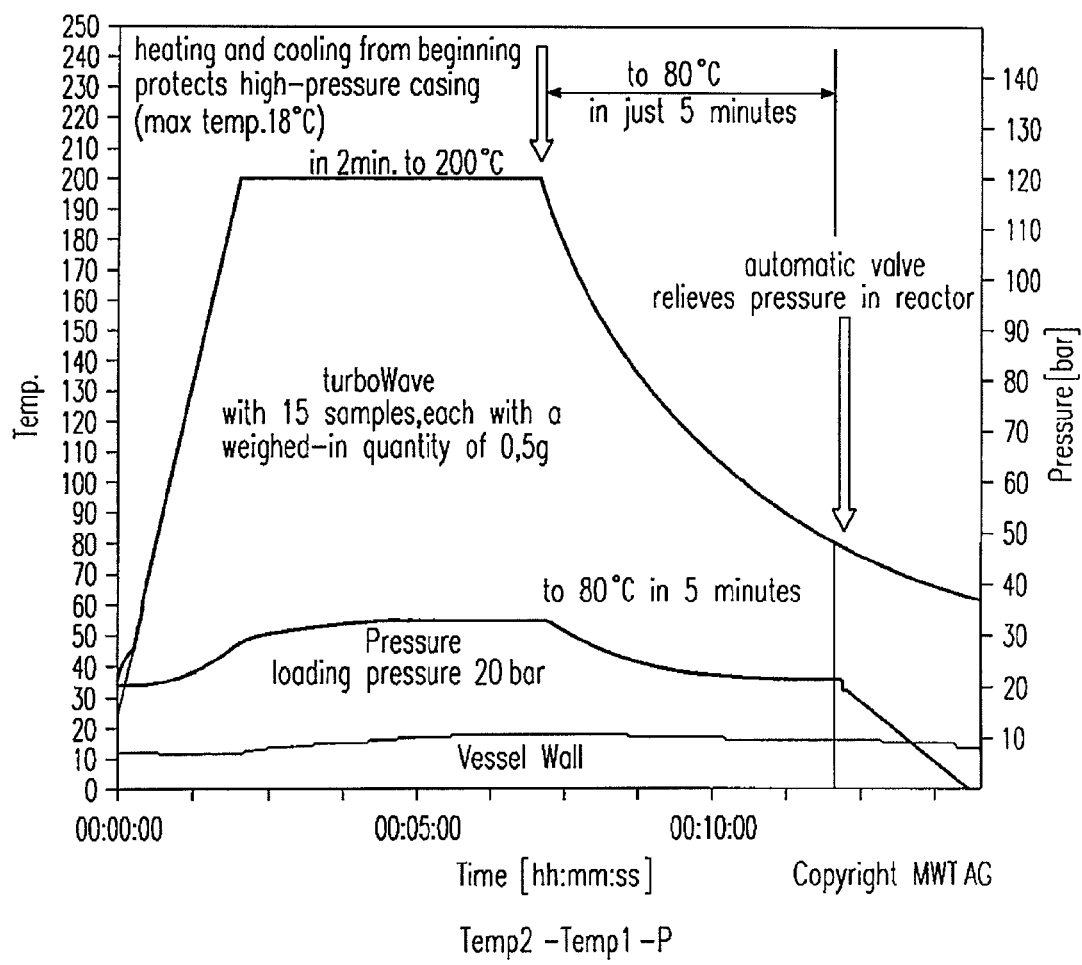
FIG. 3 shows a graph of an example of an implementation of the process according to the invention.

FIG. 3 shows, for example, a graph for a simultaneous processing of 15 samples, each with an original weighed-in quantity of 500 mg, in an abovementioned system. It can be deduced from the graph that there is, in particular, an extremely rapid heating of the sample P. The sample P reaches a temperature of 250° C. after just 5 minutes, and 300° C. after 10 minutes. The internal pressure of the reaction chamber 2 can be kept essentially at a constant level, for example also with the aid of the automatic pressure relief, either by a lid that is pretensioned (by a spring) and/or an excess pressure escape valve, preferably in the outlet FA. As can be seen in FIG. 3, after just 13 minutes the casing of the high-pressure vessel 1 is cooled in a targeted fashion with the aid of the cooling arrangement 4, which, as described above, results in extreme protection of the material compared with the previously known conventional autoclaves. In addition, owing to the low temperature of the high-pressure vessel, after the sample reaction is complete a particularly rapid cooling (for example to below 80° C.) is achieved within just 12 minutes. For example, the samples P can thus be extracted and analyzed after 30 minutes even at temperatures of over 300° C. To facilitate things, the system to this end has the housing arrangement according to the invention, wherein a high-pressure vessel can be provided with multiple samples, for example in a sample holder, or just one lid with corresponding lid regions for all vessels 1, and the samples P can preferably be moved out of the housing arrangement together with the lid.

Figure 4:
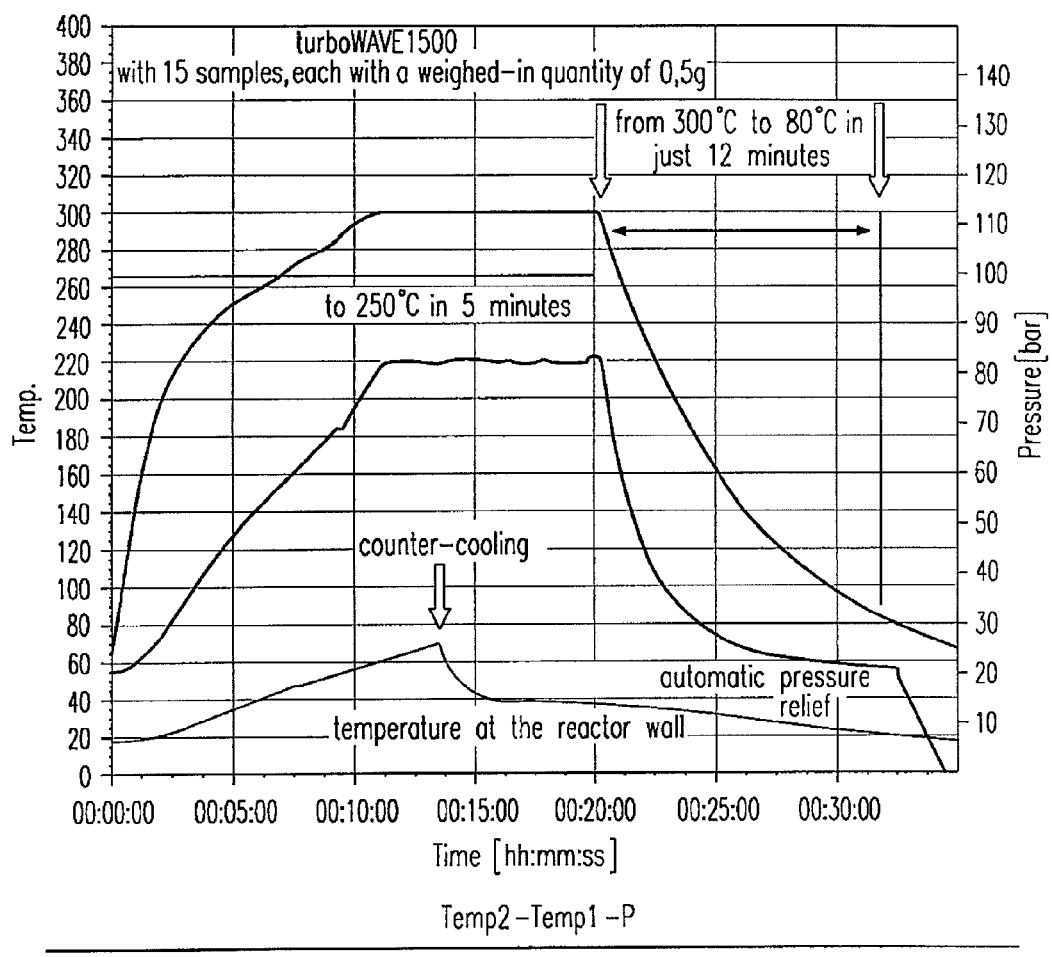
FIG. 4 shows a graph of an example of an implementation of the process according to the invention.

FIG. 4 shows a further arrangement for an experiment, wherein the high-pressure vessel 1 is cooled from the beginning and permanently by the cooling arrangement 4 and is thus kept, for example, constantly below 20° C. Corrosion of the high-pressure vessel 1, for example caused by molecules diffusing through the insulation lining, is thus prevented. As a result, the entire material of the high-pressure vessel 1 such as, for example, a special steel is, inter alia, protected and thus sustains practically no wear. Despite the cooling of the high-pressure vessel 1 in order to protect it, the arrangement for an experiment has an extremely rapid and high heating rate, so that the sample P is heated up to 200° C. after just 2 minutes. As a result of the insulation lining 3, additionally only a small thermal load is applied to the high-pressure vessel 1.

This is achieved even with a relatively small wall thickness of the insulation lining 3. On the other hand, because of the cooling, the sample P can be cooled rapidly after the sample reaction to a temperature such that the sample P can be handled again by the user.

Other processes or process steps are described additionally in the course of the description, also in conjunction with the following FIGS. 5 to 10. The process steps can be carried out in all embodiments and are not limited to a specific embodiment.

A further embodiment of the device according to the invention is shown in FIGS. 5 to 9. What has been said with respect to the above exemplary embodiments applies equally to the following embodiment too, so that to prevent repetition it is not dealt with in detail again.

Figure 5:
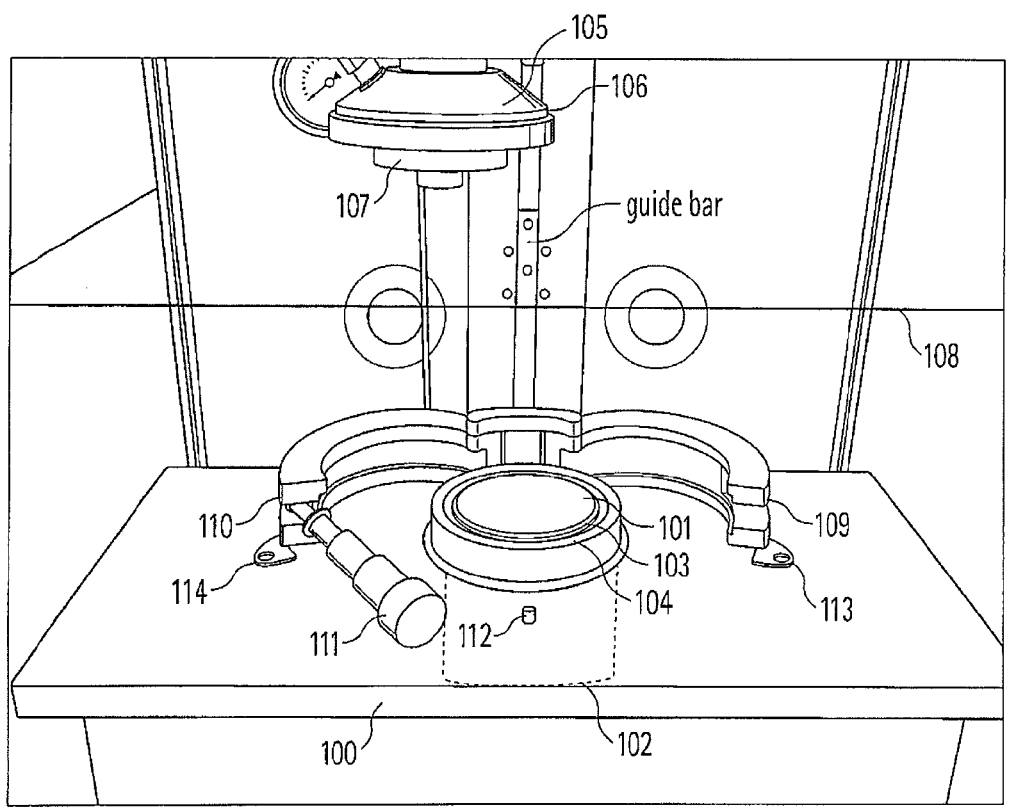
FIG. 5 shows a front view of a microwave-based apparatus according to the invention for decomposing or for synthesizing or analyzing samples.

FIG. 5 shows a front view of a microwave-based apparatus according to the invention for decomposing or for synthesizing or analyzing samples. The sample vessel 101 is here held in the operating state in a lowered position in a substructure 100. A magnetron (not shown) is accommodated in the substructure 100, the microwave power being injected at the lower end 102 of the vessel into the inside of the high-pressure vessel 101. The vessel preferably has a capacity of 0.5 to 1 liter.

In FIG. 5, the PTFE insert is designated by 103 and has, for example, a wall thickness of 3 to 10 mm, preferably 4 to 6 mm. The steel casing surrounding the PTFE insert is designated by the reference numeral 104.

The upper part of the vessel is provided with the reference numeral 105, a PTFE lid insert 107 being attached to a steel lid 106 with gas passages (described in more detail below) on the lower region.

FIG. 5 shows the sample vessel 101 in an open state, in which the lid part 105 has thus been moved away.

In the operating state, the lid part 105 is automatically lowered, i.e. is controlled by a control unit and a motor, a transparent protective hood 108 being lowered simultaneously with the lid part.

When the cover part 105 rests on the lower part of the vessel 101 in FIG. 5, pretensioned by springs (as explained in more detail below), both clamp halves 109/110, which together form the circular metal clamp, can be closed. When the two steel clamp halves 109/110 shown in the open state in FIG. 5 are closed, they can be secured against each other by a bolt 111.

The above-described retaining means 7 has the two clamp halves 109, 110 which together form the essentially circular clamp. The lower part 5, 104 and the lid part 6, 105 can be locked by the retaining means 7 (109/110), and the clamp halves 109, 110 can be secured against each other by the bolt 111 in the closed state. The locking of the retaining means 7 and of the two clamp halves 109/110 by the bolt 111 is described in more detail with reference to FIG. 9.

An automatically actuatable pin is shown by 112 in FIG. 5 which engages, in the closed state of the two clamp halves 109/110, in recesses 113/114 on the clamp halves 109/110, when these recesses 113/114 lie flush one above the other when the vessel is closed.

Figure 6:
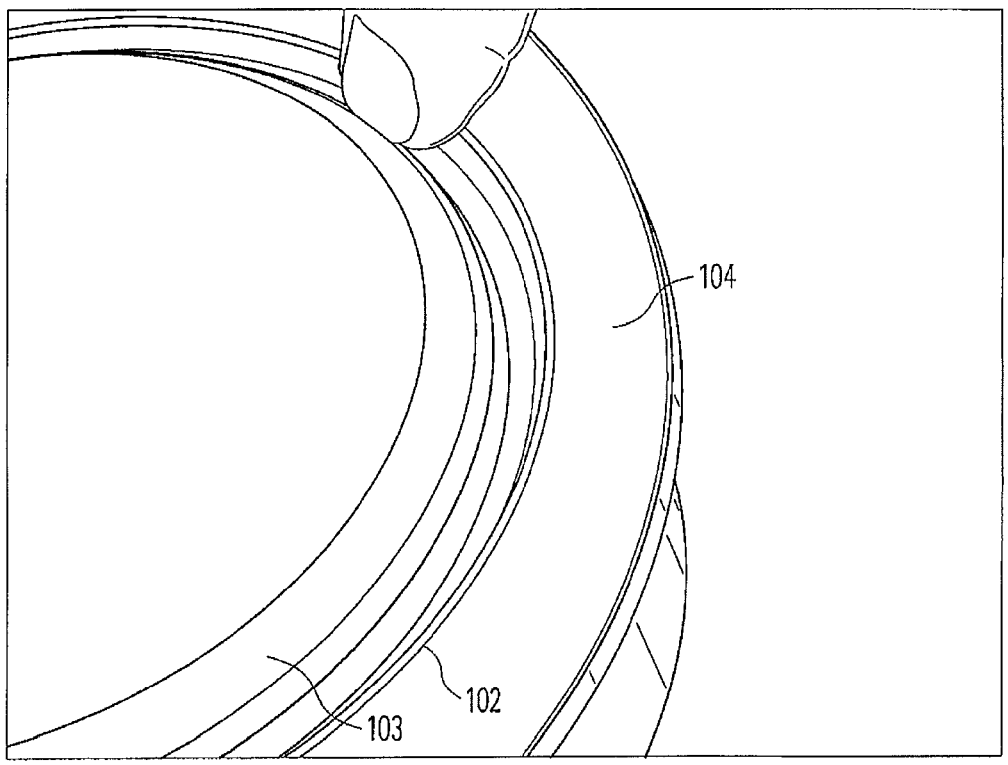
FIG. 6 shows a detailed view of the top side of the lower part of the vessel in the open state.

The upper side of the lower part of the vessel 101 can be seen in FIG. 6 in the open state. In turn, the PTFE insert is designated by 103 and the steel casing by 104. A short PTFE tube shoulder can be laid in a recess or groove 120 on the inside of the steel casing 104, and an O-ring can in turn bear against its inner side. This O-ring is then secured from the outside by the short tubular PTFE insert and the steel casing 104 which surrounds it and thus cannot shift position.

FIG. 7 again shows in detail the upper part 105, and in particular a dovetail-shaped cutout 121 can be seen in this FIG. 7 on the underside of the PTFE lid 107. A sample cartridge holder can be inserted into this dovetail-shaped cutout and thus retained.

As an alternative to this dovetail-shaped mechanical holder 121, a magnetic retainer can also be provided. In other words, magnets which retain the cartridge holder can be provided in the upper part 105 of the vessel. When the magnets provided in the upper part 5 can be driven rotatably by a motor, then a stirrer can, for example, also be driven magnetically, which is advantageous in particular when the microwave-based apparatus is used for the sample analysis.

The high-pressure vessel can consequently have a motor by means of which magnets of the magnetic retainer can be driven rotatably. Moreover, a stirrer can be arranged in the magnetic rotatably driven retainer and can then be driven by the magnetic retainer.

The lid part 105 has the mechanical holder 121 or magnetic retainer for holding the sample holder 101 and/or the vessel insert 9 shown in FIGS. 1 and 2.

The sample holder 101 and/or the vessel insert 9 can thus be connected detachably to the lid part 105.

Figure 8:
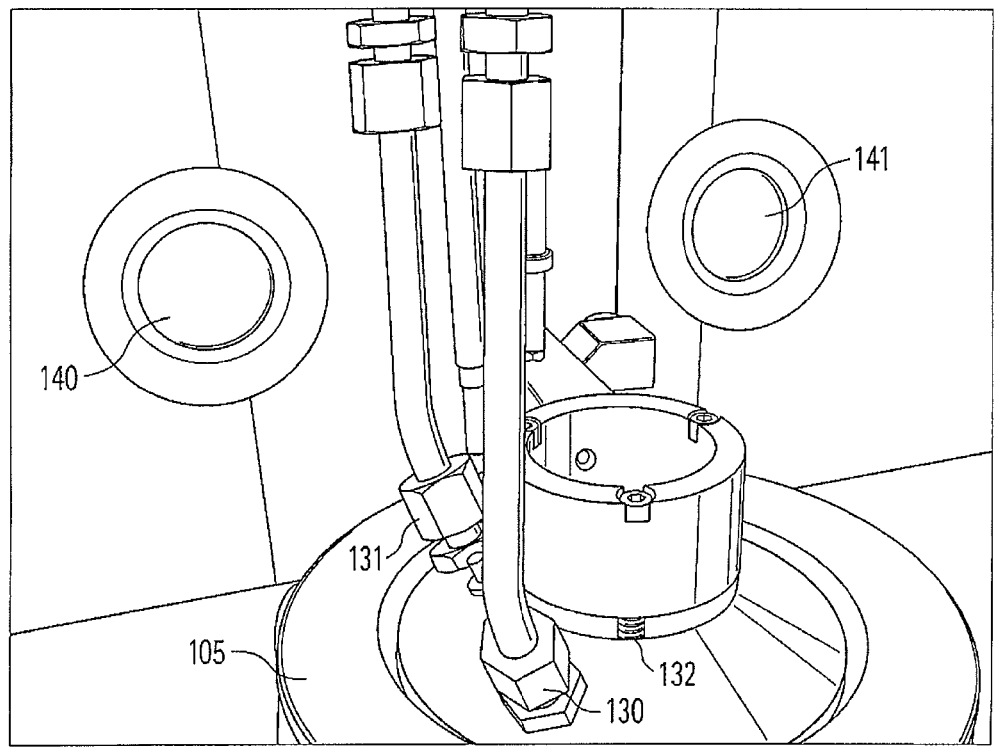
FIG. 8 shows a detailed view of the upper part of the sample.

The upper part 105 of the sample vessel can be seen from above in FIG. 8. Furthermore, a gas inlet 130 and a gas outlet 131 are shown which each pass through the upper part 105 of the sample vessel. Lastly, the springs 132 are also shown, by means of which a retainer pretensions the upper part 105 of the vessel relative to the lower part (see FIG. 5).

The outlets 140/141 are furthermore shown in FIG. 8 which represent a drain for the volume enclosed by the hood 108 (FIG. 5).

The outlet 131 is designed such that its diameter is larger than that of the inlet 130.

A needle valve, which is particularly pressure-resistant, can be arranged in the outlet line 131. Moreover, for safety reasons a rupture disk can also be provided in the discharge line so that pressure can be discharged rapidly in the event of an undesired reaction in the sample space which generates gas.

Figure 9:
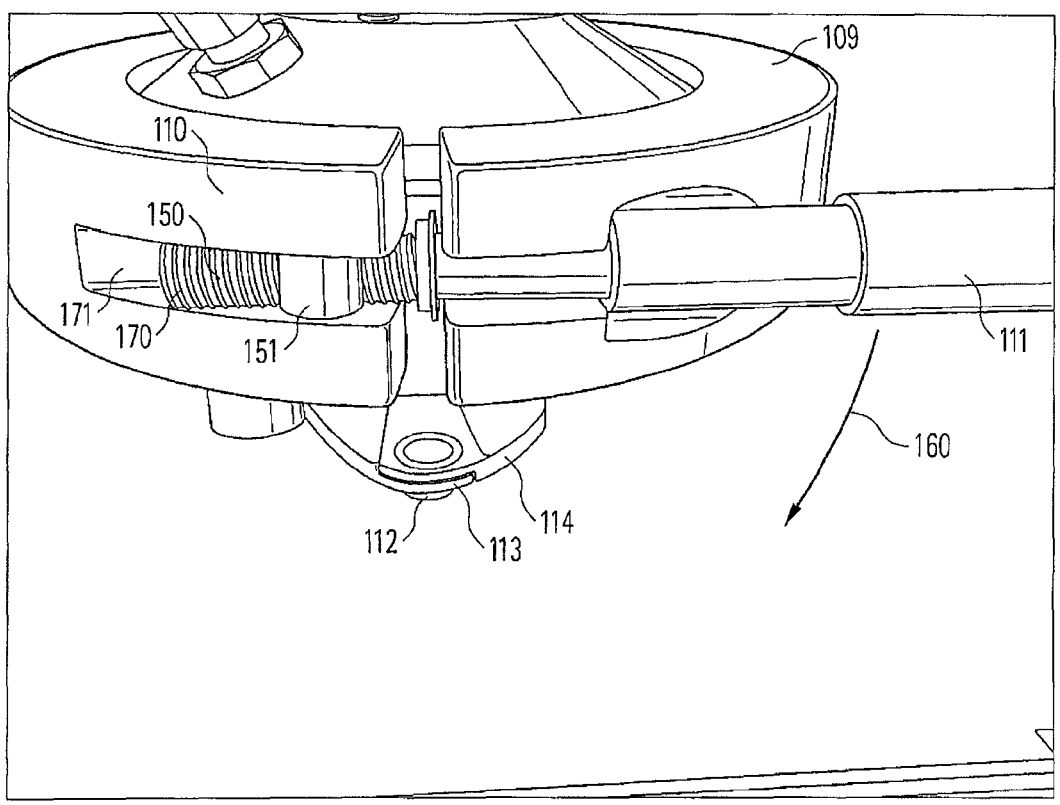
FIG. 9 shows a detailed view of a locking means for the two clamp halves using a bolt.

The detail of the retaining means 7 and therefore of the locking of the two clamp halves 109/110 by means of the bolt 111 is again shown in FIG. 9. A thread 150 of this bolt 111 engages in a thread 151 in one of the two clamp halves 110 so that the latter can be pulled against each other. In the state shown in FIG. 9, the two bores in the brackets 113/114 are flush with each other so that the pin 112 (see also FIG. 5) can engage in said bores to prevent an undesired opening of the two clamp halves. It is furthermore provided that that part of the thread 150 of the bolt 111 which projects beyond the thread 151 of one clamp half 110 has a length such that the bolt 111 is also thereby prevented from being screwed out in the direction of the arrow 160 in FIG. 9. The protruding part 170 abuts namely, because of its length, in a locking fashion against the wall 171 in a recess of the clamp half 110.

Furthermore, the apparatus can additionally have, preferably in the lid part 105, a further inlet (not shown) and a further outlet (not shown), the inlet projecting into the sample space only as far as into an upper region of the sample space and therefore preferably being spaced apart from a sample arranged in the sample space, while the outlet is preferably provided with a needle valve and projects into a lower region of the sample space in such a way that it projects into the sample during the sample reaction, and hence while the apparatus is operating. An inert gas or hydrogen or any other fluid can, for example, be conveyed into the sample space via the inlet and a line attached thereto for the purpose of purging with gas or a reaction. A sample of the sample P which is heated, for example, to above boiling point can be extracted simply via the outlet by means of the needle valve and in particular while the apparatus continues to operate.

The inlet and the outlet are preferably provided with screw valves in order to regulate the inflow and outflow. To this end, the protective hood 108 preferably has one or more flaps in order to selectively reach the valves in order to operate them. The flaps can also serve to reach the locking device in the form of the two clamp halves 109/110 when the protective hood is lowered and lock it as described above.

The outlet is also preferably attached to a line via which the extracted sample is drained off. To this end, the line is preferably provided with a cooling device so that the sample condenses on the inner wall of the line and can be drained off into a sample holding vessel for further analysis. This happens while the sample reaction continues uninterrupted in the apparatus so that analysis of the sample can be carried out at any time without interrupting the operation of the apparatus.

Figure 7:
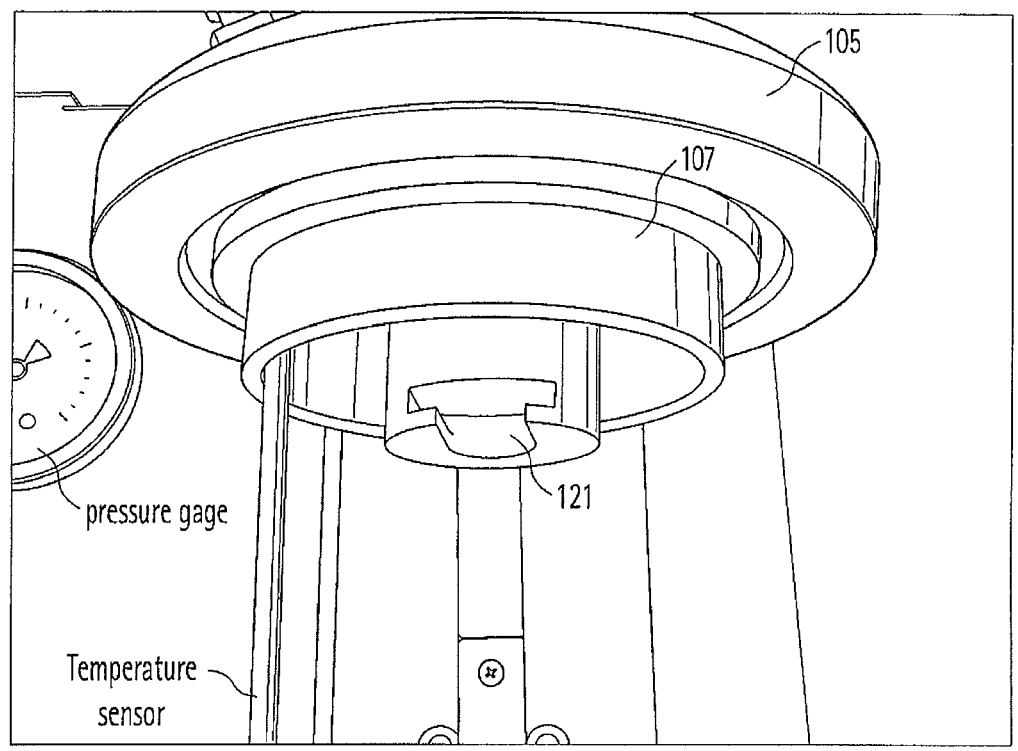
FIG. 7 shows a detailed view of the upper part.

As shown in FIG. 7, the apparatus also has a temperature sensor which is, for example, made from tantalum. The temperature sensor is preferably arranged or attached on the lid part 105 in such a way that it projects into the sample space when the latter is closed. Other embodiments known to a person skilled in the art for measuring the temperature in the sample space are, however, also possible.

According to a process for initiating and/or promoting chemical and/or physical high-pressure reactions on samples, the samples are heated, and thus exposed to pressure, in a reaction chamber which can be heated by heat of a high-pressure vessel surrounding the reaction chamber on all sides and which has the lower part 5, 104 and the lid part 6, 105, the sample holder 101 and/or the vessel insert 9 being connected to the lid part 6, 105, and the lower part 5, 104 and the lid part 6, 105 being moved relative to each other in an automated fashion between an open access position and a closed microwave-processing position.

The lower part 5, 104 and the lid part 6, 105 are preferably also locked by the retaining means 7, the retaining means 7 having the two clamp halves 109, 110 which together form the essentially circular clamp and are secured against each other by the bolt 111 when the vessel is closed.

The high-pressure vessel preferably consists of the pot-shaped lower part 5, 104 and the lid part 6, 105 which surround the reaction chamber 2 on all sides when the vessel is closed, the lid 6, 105 being pretensioned, and the lid 6, 105 lifts off from the lower part 5, 104 at a predetermined internal pressure counter to the pretensioning so as not to exceed the predetermined internal pressure by allowing pressure to escape.

A seal, which reliably seals off the reaction chamber 2 from the outside in the closed pretensioned state, can also be provided between the lid 6, 105 and the lower part 5, 104, the seal allowing pressure to escape at a predetermined internal pressure.

The high-pressure vessel can, to create an internal pressure in the reaction chamber, have a fluid inlet and a fluid outlet in order to allow an internal pressure in the reaction chamber which exceeds a specified value to escape.

Similarly, the high-pressure vessel can have a gas purging arrangement, the gas purging arrangement having a fluid inlet and a fluid outlet. A line via which an extracted sample is drained off is attached to the outlet, while the sample reaction continues in an uninterrupted fashion in the apparatus so that analysis of the sample can be carried out at any time without interrupting the operation of the apparatus. The line can moreover be provided with a cooling device so that the sample condenses on the inner wall of the line and is drained off into a sample holding vessel for further analysis.

Figure 10:
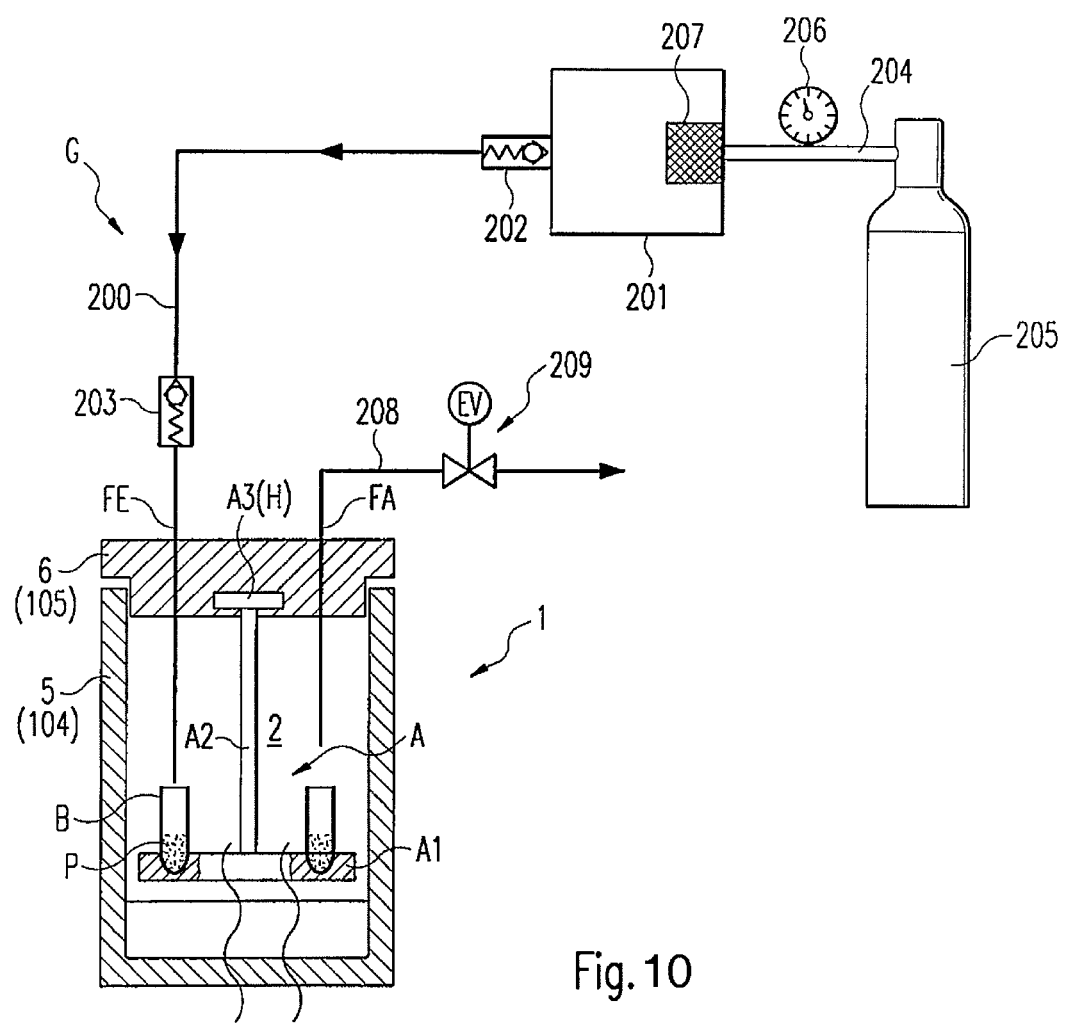
FIG. 10 shows a schematic representation of a high-pressure vessel according to the invention with a gas purging device.

A further embodiment of the device according to the invention is shown in FIG. 10. What has been said with respect to the above exemplary embodiments applies equally to the following embodiment too, so that to prevent repetition it is not dealt with in detail again.

FIG. 10 shows schematically the structure of the high-pressure vessel 1 which has already been described above with reference to FIGS. 1 to 4 and 5 to 9. For the sake of simplicity, the features insulation lining or PTFE insert and PTFE lid insert, cooling arrangement, flange regions, retaining means, seals, etc are, for example, not shown. The microwave generator is depicted in a simplified fashion by the microwaves MW which are shown; as an alternative, an above-described immersion heater (see FIG. 2) or the like can also be used in a manner which similarly is described above.

In the exemplary embodiment shown, the samples P are arranged in individual sample vessels B in the high-pressure vessel 1 and hence in the reaction chamber 2. For this purpose, the sample vessels B are in turn held in a sample holder A. The sample holder A (or the sample cartridge holder) can, for this purpose, have, for example, a plate-shaped base plate A1 with holding devices (for example recesses) for the sample vessels B provided therein. The base plate A1 can be connected to the lid part 6, 105 by a connection A2. To achieve this, the connection A2 can be removably accommodated in a retainer A3 in the lid part 6, 105. This retainer A3 can, as already described above, take the form of, for example, a dovetail-shaped cutout on the underside of the lid part 6, 105 and into which the sample holder or the sample cartridge holder A is inserted and thereby retained.

A magnetic retainer H can also be provided instead of the dovetail-shaped mechanical holder. In other words, magnets which retain the cartridge holder A can be provided in the upper part 6, 105 of the vessel. When the magnets provided in the upper part 6, 105 can be driven rotatably by a motor, the sample cartridge holder A can, for example, be driven magnetically and the samples P rotated in the sample space 2, which is advantageous for analyzing the samples, in particular when the microwave-based apparatus is used, because of a uniform heating of the samples P. In this case, the connection A2 serves as a shaft which can be connected concentrically or eccentrically to the base plate A1.

Furthermore, an embodiment is shown in FIG. 10 of a gas purging device or gas purging arrangement G which is described below.

The high-pressure vessel 1 can have a fluid inlet FE, 130 and a fluid outlet FA, 131, already described above, for gas purging. A gas feed line 200 extends on or from the fluid inlet FE, 130 to a gas supply chamber or a gas supply vessel 201. One or more non-return valves 202, 203 are situated in the gas feed line 200, between the gas supply chamber 201 and the high-pressure vessel 1 or the reaction chamber 2. The non-return valves 202, 203 ensure that the gas can be fed only in the direction of the high-pressure vessel 1 or the reaction chamber 2 and that no gas or other reaction products can return through this line 200 from the reaction chamber 2.

The gas supply chamber 201 is in turn connected to a gas cylinder 205 via a line 204; to be more precise, the gas cylinder 205 is connected to the gas supply chamber 201 via a manometer 206 and a prefilter 207, wherein the prefilter 207 is preferably arranged in the gas supply chamber 201 and takes the form of a particle filter. The gas cylinder 205 has a gas for gas purging. This gas can, for example, be argon (Ar), nitrogen ($N_2$), hydrogen ($H_2$) or another known purging gas. The purging gas in the gas cylinder 205 is preferably at a pressure of approximately 200-300 bar. The gas is selectively introduced into the gas supply chamber 201 via the line 204 and thus via the manometer 206 and the prefilter 207, and is provided at a predefined pressure, preferably a pressure of 50 bar, for the gas purging of the high-pressure vessel 1. The size of the gas supply chamber 201 and the feed pressure are not limited by the invention but can be provided individually depending on the high-pressure vessel 1 and the reaction that is being conducted in the reaction chamber 2.

A gas outlet line 208 extends from the fluid outlet FA, 131 away from the reaction chamber 2. An escape valve 209 is arranged in the gas outlet line 208 in order to selectively open and close the gas outlet line 208. The escape valve 209 can here be an electrical or a manual valve. The gas outlet line 208 which is connected to the fluid outlet FA, 131 preferably has a larger diameter than the gas feed line 200 which is connected to the fluid inlet FE, 130, as the gas outlet line 208 of the fluid outlet FA, 131 needs to withstand the high internal pressure and the high temperatures when pressure is allowed to escape. The gas feed line 200 preferably has a diameter of 2-4 mm, while the gas outlet line 208 preferably has a diameter of approximately 6 mm. The invention is, however, not limited to these line diameters.

It should be noted, with respect to the embodiment according to FIGS. 5 to 9, that the gas purging arrangement described therein can have two fluid outlets, one for extracting samples and one for discharging the gas from the reaction and the purging gas, as described with reference to FIG. 10.

A gas purging process is described below.

The reaction chamber 2 is fed from the gas cylinder 205 with a gas at a pressure of, for example, 50 bar (or a microwave-induced reaction). The gas is here conveyed from the gas cylinder 205 via the manometer 206 and the prefilter 207 into the gas supply chamber 201. After the gas was provided in the gas supply chamber 201, the supply of gas from the gas cylinder can preferably be stopped, for example by means of a valve. Sufficient pressurized purging gas (for example at 50 bar) is thus available for the gas purging, while at the same time the consumption of purging gas can be adjusted to the required quantity and purging gas can thus be saved.

One or more non-return valves is/are situated between the gas supply chamber 201 and the reaction chamber 2 and ensure that the gas can be fed only in the direction of the reaction chamber 2 and that no gas or other reaction products can return through the gas feed line 200 from the reaction chamber 2.

When the temperature and the pressure rise in the reaction chamber 2, initiated by the microwave radiation (or another means of heating the samples P), so that the pressure in the high-pressure vessel 1 rises above the gas feed pressure, it can happen that (at least as far as the first non-return valve 203) gaseous or other reaction products, and possibly acid components, ascend into the gas feed line 200.

According to the gas purging device G according to the invention, the escape valve 209 can now be opened manually or automatically in order to purge the gas feed line 200 including all the non-return valves 202, 203 in the direction of the reaction chamber 2. The purging process thus starts as soon as the pressure in the reaction chamber 2 falls below the pressure in the gas supply chamber 201, wherein the gas in the gas supply chamber 201 which is at the feed pressure (for example, 50 bar) flows in the direction of the reaction chamber 2, through the latter, out of the gas outlet line 208 and via the escape valve 209, and the device is thereby purged. A "buffer purge" is consequently provided, wherein, to purge the system, a gas supply chamber 201 is preferably filled just once with a purging gas at a predetermined pressure which is then available in a sufficient quantity for the subsequent process, in particular for gas purging. In this way, a reliable gas purging can be provided which has a low consumption of purging gas and in addition lengthens the operating life of the device.

The high-pressure vessel 1 can, moreover, be provided with a sensor which measures the pressure inside the reaction chamber 2. If the pressure exceeds a preset threshold value, a visual and/or acoustic alarm signal can be emitted which prompts the user to open the manually actuated escape valve 209 for gas purging. Alternatively, the control unit can also control and open the electric escape valve 209 when the preset threshold value of the pressure inside the reaction chamber 2 is exceeded.

The process steps of all the above-described processes can be carried out in any desired combination.

It should be pointed out that the invention is not limited to the forms illustrated in the abovementioned exemplary embodiments, as long as they are encompassed by the subject of the claims. In particular, the high-pressure vessel is not limited to the abovementioned pot shape. Similarly, other options for heating the sample are conceivable. The cooling arrangement is also not limited to a cooling using a circulatory cooler, as long as the required cooling is obtained. Moreover, the invention is not limited to a special material for the internal lining, as long as it achieves the desired insulation effect. All features of the abovementioned exemplary embodiments can be combined or occur together in any desired manner.

The invention claimed is:

1. A high-pressure vessel for holding samples which are to be heated, the high-pressure vessel comprising:
    a lower part (5, 104) and a lid part (6, 105), wherein the lower part and the lid part are configured to allow locking the lower part and the lid part together, and further configured such that, when locked together, the lower part and the lid part surround on all sides a reaction chamber;
    wherein the reaction chamber is configured to allow initiating and/or promoting chemical and/or physical high-pressure reactions;
    wherein the lower part and the lid part are further configured to allow movement relative to each other in an automated fashion between an open access position and a closed microwave processing position;
    at least one of a sample holder (101) and a vessel insert (9) coupled to the lid part (6, 105);
    wherein the high-pressure vessel also has a retaining element (7) that is configured to allow locking the lower part (5, 104) and the lid part (6, 105);
    wherein the retaining element (7) has two clamp halves (109, 110) which together form an essentially circular clamp, wherein the clamp halves are securable against each other by a bolt (111) in a closed state, wherein a thread (150) of the bolt (111) is configured to allow engagement with a thread (151) in one of the two clamp halves (110) to so allow pulling the clamp halves against each other, and wherein that part (170) of the thread (150) of the bolt (111) which projects beyond the thread (151) of one of the clamp halves (110) has a length, when the vessel is closed, such that the protruding part (170) abuts, because of its length, in a locking fashion against a wall (171) in a recess of the claim half (110),
    wherein the lower part (5, 104) and the lid part (6, 105) have corresponding flange regions (50, 60);
    wherein the lower part (5, 104) and the lid part (6, 105) are configured to allow pressing against each other via the retaining element (7);
    wherein the clamp halves (109, 110) are arranged about the flange regions (50, 60) such that the high-pressure vessel (1) surrounds and thus forms the locked pressure-resistant reaction chamber (2); and
    further comprising an automatically actuable pin (112) which is configured to engage, in the closed state of the two clamp halves (109, 110), in recesses (113, 114) on the clamp halves (109, 110), when these recesses (113, 114) lie flush one above the other when the vessel is closed.

2. The high-pressure vessel as claimed in claim 1, wherein the at least one of the sample holder and the vessel insert is detachably coupled to the lid part (6, 105), wherein the lid part (6, 105) has a mechanical holder (121) or magnetic retainer suitable for holding the at least one of the sample holder (101) and the vessel insert (9), and wherein, when the lid part (6, 105) has the magnetic retainer, the high-pressure vessel also has a motor that is configured to rotatably drive magnets of the magnetic retainer, wherein a stirrer that is configured to allow operation by the magnetic retainer is arranged in the magnetic retainer.

3. The high-pressure vessel as claimed in claim 1, wherein the high-pressure vessel has an insulation lining enclosing the reaction chamber (2), and a cooling device, that surrounds at least a region of the sample holder of the pressure vessel such as to allow simultaneous heating and cooling of the pressure vessel, and optionally wherein the insulation lining is formed by the vessel insert.

4. The high-pressure vessel as claimed in claim 1, configured to allow heating of the samples in the vessel by microwaves, wherein the reaction chamber is at least partially microwave-transparent and configured to allow coupling of the reaction chamber to a microwave generator by a microwave-transparent coupling opening, or wherein the reaction chamber is configured to allow direct heating of a sample by a thermal immersion heater, and optionally wherein the immersion heater is coupled to the lid.

5. The high-pressure vessel as claimed in claim 1, wherein the high-pressure vessel has a fluid inlet (130) and a fluid outlet (131) configured to allow creation of an internal pressure in the reaction chamber and further configured to allow discharging an internal pressure in the reaction chamber which exceeds a specified value, wherein the fluid inlet (130) and the fluid outlet (131) are arranged in the lid.

6. The high-pressure vessel as claimed in claim 1, wherein the high-pressure vessel has a gas purging arrangement (G), the gas purging arrangement (G) having a fluid inlet (FE, 130) and a fluid outlet (FA, 131), and wherein the fluid inlet (FE, 130) and the fluid outlet (FA, 131) are arranged in the lid.

7. The high-pressure vessel as claimed in claim 6, wherein a gas feed line (200) extends from the fluid inlet (FE, 130) of the gas purging arrangement (G) to a gas supply chamber (201), the gas supply chamber (201) having a purging gas which is at a predefined feed pressure, and at least one non-return valve (202, 203), configured to permit feeding of gas only to the reaction chamber (2), being situated between the gas supply chamber (201) and the reaction chamber (2), and wherein a gas outlet line (208) extends from the fluid outlet (FA, 131) away from the reaction chamber (2), an escape valve (209) being arranged in the gas outlet line (208) for selectively opening and closing the gas outlet line (208).

8. An apparatus for initiating and/or promoting chemical and/or physical high-pressure reactions on samples by the use of heat, comprising:
a housing arrangement, wherein the housing arrangement includes one or more high-pressure vessels as claimed in claim 1;
wherein the high-pressure vessels are configured to allow holding samples in respective reaction chambers, and further configured to allow moving the samples together with the lid part and relative to the lower part; and
and further configured to allow the samples to be automatically inserted into the high-pressure vessel or removed from the high-pressure vessel by virtue of the relative movement.

9. The apparatus as claimed in claim 8, wherein a plurality of high-pressure vessels have a lid part with lid regions that correspond to the high-pressure vessels and are provided with an insulation lining.

10. This high pressure vessel as claimed in claim 1, wherein the insulating lining is made of PTFE.

11. A process for initiating and/or promoting chemical and/or physical high-pressure reactions on samples, comprising:
heating the samples and thereby exposing the samples to pressure in a reaction chamber which can be heated by heat of a high-pressure vessel;
wherein the high-pressure vessel surrounds the reaction chamber on all sides and has a lower part (5, 104) and a lid part (6, 105), and further comprises a sample holder (101) and/or a vessel insert (9) being coupled to the lid part (6, 105), and
moving the lower part (5, 104) and the lid part (6, 105) relative to each other in an automated fashion between an open access position and a closed microwave-processing position;
wherein the high-pressure vessel also has a retaining element (7) that is configured to allow locking the lower part (5, 104) and the lid part (6, 105);
wherein the retaining element (7) has two clamp halves (109, 110) which together form an essentially circular clamp, wherein the clamp halves are securable against each other by a bolt (111) in a closed state, wherein a thread (150) of the bolt (111) is configured to allow engagement with a thread (151) in one of the two clamp halves (110) to so allow pulling the clamp halves against each other, and wherein that part (170) of the thread (150) of the bolt (111) which projects beyond the thread (151) of one of the clamp halves (110) has a length, when the vessel is closed, such that the protruding part (170) abuts, because of its length, in a locking fashion against a wall (171) in a recess of the clamp half (110), and wherein the vessel further comprises an automatically actuable pin (112) which is configured to engage, in the closed state of the two clamp halves (109, 110), in recesses (113, 114) on the clamp halves (109, 110), when these recesses (113, 114) lie flush one above the other when the vessel is closed
wherein the lower part (5, 104) and the lid part (6, 105) have corresponding flange regions (50, 60);
wherein the lower part (5, 104) and the lid part (6, 105) are configured to allow pressing against each other via the retaining element (7); and
wherein the clamp halves (109, 110) are arranged about the flange regions (50, 60) such that the high-pressure vessel (1) surrounds and thus forms the locked pressure-resistant reaction chamber (2).

12. The process as claimed in claim 11,
wherein the high-pressure vessel is made from a material that withstands high pressures and surrounds the reaction chamber on all sides;
wherein the high-pressure vessel has an insulation lining enclosing the reaction chamber; and
heating the insulation lining by the heat and simultaneously cooling the insulation lining by a cooling arrangement surrounding at least a region of the sample holder of the high-pressure vessel,
wherein the high-pressure vessel, to create an internal pressure in the reaction chamber (2), has a fluid inlet and a fluid outlet in order to allow an internal pressure in the reaction chamber which exceeds a specified value to escape, wherein a line via which an extracted sample is drained off is attached to the outlet, while the sample reaction continues in an uninterrupted fashion in the apparatus so that analysis of the sample can be carried out at any time without interrupting the operation of the apparatus, and wherein the line is provided with a cooling device so that the sample condenses on the inner wall of the line and is drained off into a sample holding vessel for further analysis.

13. The process as claimed in claim 12, wherein the high-pressure vessel is cooled in such a way that it does not exceed a predetermined temperature threshold value, and/or wherein the high-pressure vessel is cooled from the beginning of the heating process.

14. The process as claimed in claim 11 or claim 12, wherein the high-pressure vessel has a gas purging arrangement (G), the gas purging arrangement (G) having a fluid inlet (FE, 130) and a fluid outlet 5 (FA, 131), wherein an escape valve (209) in a gas outlet line (208) that extends from the fluid outlet (FA, 131) away from the reaction chamber (2) is selectively opened, wherein a purging gas in a gas supply chamber (201) at a feed pressure flows, when the escape valve (209) is opened, via a gas feed line (200) that extends from the fluid inlet (FE, 130) of the gas purging arrangement (G) in the direction of the reaction chamber (2), through the latter, and out of the gas outlet line (208) and via the escape valve (209), and purges the high-pressure vessel (1), and wherein at least one non-return valve (202, 203) is situated between the gas supply chamber (201) and the reaction chamber (2) and permits the feeding of gas only to the reaction chamber (2).

15. The process claimed in claim 11 or 12, wherein the insulating lining is made of PTFE.

* * * * *